United States Patent [19]
Akutsu et al.

[11] Patent Number: 4,897,669
[45] Date of Patent: Jan. 30, 1990

[54] THERMAL TRANSFER RECORDING MEDIA

[75] Inventors: Eiichi Akutsu; Koichi Saito; Yoshihiko Fujimura; Nanao Inoue; Kiyoshi Horie; Hiroshi Fujimagari, all of Kanagawa, Japan

[73] Assignee: Fuji Xerox Co., Ltd., Tokyo, Japan

[21] Appl. No.: 257,578

[22] Filed: Oct. 14, 1988

[51] Int. Cl.$^4$ .............................................. G01D 15/10
[52] U.S. Cl. ............................ 346/76 PH; 346/76 R; 400/120; 400/241; 400/241.1
[58] Field of Search ........................ 346/76 R, 76 PH; 400/241, 241.1, 120 PH

[56] References Cited

U.S. PATENT DOCUMENTS 4,309,117 1/1982 Chang et al. .................... 400/241.1
4,699,537 10/1987 Crowe et al. .................... 400/241.1
4,810,119 3/1989 Afzali-Ardakani et al. ... 346/76 PH

FOREIGN PATENT DOCUMENTS 56-93585 7/1981 Japan .
0242555 10/1987 Japan ............................ 346/76 PH

*Primary Examiner*—Clifford C. Shaw
*Assistant Examiner*—Huan Tran
*Attorney, Agent, or Firm*—Finnegan, Henderson, Farabow, Garrett, and Dunner

[57] ABSTRACT

A current-conducting thermosensitive recording media used for non-impact recording which attains better energy efficiency and higher printing speeds through a thermosensitive recording ink medium comprising: a stratified ink support in which electrical conductivity in the direction of the thickness is greater than the electrical conductivity in the direction of the surface; a thermogenetic resistor layer for producing heat; a return electrode layer; a thermally melting ink layer; and an ink separating layer. The thermogenetic resistor layer, the electrode layer, the ink separating layer, and the thermally melting ink layer are laminated on the ink support in that order.

17 Claims, 5 Drawing Sheets

THERMAL TRANSFER RECORDING MEDIA

BACKGROUND OF THE INVENTION

1. Field of the Invention

The present invention relates to thermal transfer recording media and print-recording methods therewith, in which the ink used is melted or sublimated by heating.

More particularly, the present invention relates to current-conducting thermosensitive recording media used for non-impact recording.

2. Description of Related Art

Various kinds of print-recording methods of recording picture information on ordinary paper are achieved through conversion of an electrical signal into thermal energy. Examples of these print-recording methods are (i) a thermal heat transfer method, (ii) a current-conducting transfer method, and (iii) a thermal transfer printing method.

In the (i) thermal heat transfer method, a thermal head used as a printing head is brought into contact with the back side of a thermally conductive recording medium (ink donor film) coated with low-melting ink. Thermal pulses are applied to the ink donor film corresponding to the picture information so that ink, at appropriate positions, is melted by thermal conduction. The melted ink is transferred onto ordinary paper (hereinafter referred to as "recording paper"). In the (ii) electrical transfer method, ink is melted by heat generated from needle electrodes, so that the melted ink is transferred to the recording paper. In the (iii) thermal transfer printing method, a thermogenetic resistor layer and a return electrode are provided on an ink support of moderate resistance. Needle electrodes are brought into contact with the ink support to form current paths in the medium which, in turn, melt the ink selectively. The melted ink is then transferred to the recording paper.

In the (i) thermal head transfer method, thermal pulses are transmitted to the ink layer through a base, such as condenser paper or the like, which forms the ink donor film. Because long-distance transmission depends on thermal conduction, the time required for printing is not less than 1 mS per picture element (dot). Accordingly, the printing speed is slow. Further, energy transmitted to the ink layer is reduced because loss occurs in the base paper portion. For this reason, no material except wax can be used as ink material, and thus there are few alternatives available in the selection of material. Furthermore, ink transfer control to recording paper is difficult because in practice, multistageous control of dot size for tone expression is troubling.

In the (ii) current-conducting transfer method, allowance for electrical conductivity to the ink layer makes color control, and therefore color recording, difficult. Further, electrical conduction loss is large and mechanical characteristic in the support portion is poor. Because printing dots are unstable and electrical anisotropy in the support portion is unsatisfactory, the method is disadvantaged in that energy loss in the portion is large.

In the (iii) thermal transfer printing method, the ink support does not have anisotropy and enlargement of dots occurs. Because leak current which does not relate to thermogenesis is large, energy efficiency is poor. Because the ink support must have some degree of resistance, the method has a problem in that contacting resistance between each electrode and the ink support necessarily increases.

To solve the aforementioned problems, a print-recording method using a non-impact type current-conducting thermosensitive recording ink medium (print ribbon) has been disclosed, for example, in Japanese Patent Unexamined Publication No. 56-93585.

FIG. 1 is a view for explaining the principle of the conventional print-recording method. In the method, a current-conducting thermosensitive recording ink medium 1 comprises an upper layer 2, a lower layer 3, a conductor layer 4 and an ink layer 5. A print electrode 6 and a ground electrode 7 are in contact with the low-resistance upper layer 2. The ground electrode 7 and the print electrode 6 are mounted such that they are not in contact with each other. When a voltage is applied to the print electrode 6 in response to a picture signal, a current flows into the upper layer 2, lower layer 3 through conductor layer 4, successively and in the lower layer 3 and upper layer 2 again and reaches the ground electrode 7. In this configuration, the upper layer 2 generates a small amount of heat but the lower layer 3 generates a large amount of heat in its portion of the current path. Thermal energy at the thermogenetic portion reaches the ink layer 5 through the conductor layer 4 to cause melting of ink. FIG. 2 shows a portion of a recording apparatus using the conventional current-conducting thermosensitive recording ink medium. Recording paper (ordinary paper) 8 is put on the ink layer 5 side of the current-conducting thermosensitive recording ink medium 1. A pressure roll 9 has the double function of urging the current-conducting thermosensitive recording ink medium 1 against the print electrode 6 and feeding the current-conducting thermosensitive recording ink medium 1 together with the recording paper 8 in a predetermined direction (in a direction perpendicular to the longitudinal direction of the print electrode).

When voltage is applied between the print electrode 6 and the ground electrode 7 in the recording apparatus, a current passes through the lower layer 3 at two positions. Accordingly, thermal energy is generated at two positions corresponding to one picture element. Ink at only one position corresponding to the print electrode 6 is transferred to the recording paper 8. In other words, ink at the other portion corresponding to the return electrode 7 is wastefully heated. Consequently, efficiency in use of energy is poor.

Further, in the current-conducting thermosensitive recording ink medium 1, electrical contact is made at the two places of the print electrode 6 and the ground electrode 7. Accordingly, contacting resistance increases resulting in wasted energy.

Having described a conventional current-conducting thermosensitive recording ink medium 1 where the ink medium 1 has an upper layer 2 and a lower layer 3, the conventional ink medium may be of another structure in which the two layers are combined to form a monolayer. However, the same problem exists in the ink medium having such a monolayer structure.

SUMMARY OF THE INVENTION

It is therefore an object of the present invention to provide a current-conducting thermosensitive recording ink medium improved in energy efficiency and printing speed. Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The foregoing object of the invention is attained, according to the present invention, by the current-conducting thermosensitive recording ink medium comprising: a stratified ink support in which the electrical conductivity in the direction of the thickness of the ink support is larger than the electrical conductivity in the direction of the surface; a thermogenetic resistor layer for producing heat by current conduction; an electrode layer electrically connected to the thermogenetic resistor layer; a thermally melting ink layer to be melted by thermogenesis of the thermogenetic resistor layer; and those layers being laminated on the ink support in that order.

It is effective to arrange an ink separating layer between the electrode layer and the thermally melting ink layer for the purpose of separating thermally melted ink from the electrode layer. It is further desirable to form the thermogenetic resistor layer of a matter having a negative temperature coefficient in a range of −2000 to +2000. Furthermore, it is preferable that the thermogenetic resistor layer is formed of a matter having a negative temperature coefficient such as zirconium oxide. Furthermore, it is preferable that the thermogenetic resistor layer includes at least one compound or element selected from a group consisting of tantalum Ta, silicon oxide $SiO_2$, boron nitride BN, silicon carbide SiC, ruthenium Ru and zirconium Zr.

It is preferable that the thermogenetic resistor layer has volume resistivity within a range of from $10^{-1}$ to $10^3 \Omega cm$. It is also preferable that the electrical resistance of the electrode layer has a value of one-tenth or less of the electrical resistance of the thermogenetic resistor layer. For example, the thermogenetic resistor layer may contain at least one ruthenium IV compound.

It is preferable that the critical surface tension of the ink separating layer is not larger than 38 dyne/cm and the decomposing point of the separating layer material is 150° C. or more. The separating layer is formed of such a solid material that does not melt or decompose due to generated heat so that its phase condition will not be changed at the time of printing and therefore the phase conditions before the printing and after the printing are the same with each other. It is also preferable that electrical conductivity in the direction of the thickness of the ink support is ten times or more as large as electrical conductivity in the direction of the surface, because current conduction must be formed mainly in the direction of the thickness of the ink support. It is preferable that end portions of the electrode layer are exposed to the outside to connect the electrode layer to the ground or apply a predetermined voltage to the electrode layer.

According to the present invention, it is unnecessary to provide two electrodes on the ink support side, because the return electrode is arranged in the current-conducting thermosensitive recording ink medium. Accordingly, a current flows through one path from the appropriate portion of the ink support to the return electrode portion opposite thereto. Consequently, energy can be utilized efficiently.

BRIEF DESCRIPTION OF THE DRAWINGS

The accompanying drawings, which are incorporated in and constitute a part of this specification, illustrate embodiments of the invention and, together with the description, serve to explain the principles of the invention. Other features and advantages of the present invention will be apparent from the following description taken in connection with the accompanying drawings, wherein.

DETAILED DESCRIPTION OF THE PREFERRED EMBODIMENTS

The present invention will be described hereunder in detail with respect to preferred embodiments thereof.

First Embodiment

Figure 1:
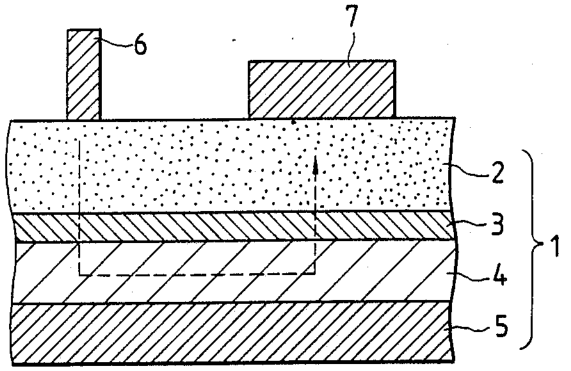
FIG. 1 is a sectional view showing the arrangement of a conventional current-conducting thermosensitive recording ink medium and electrodes being in contact with the ink medium.
Figure 2:
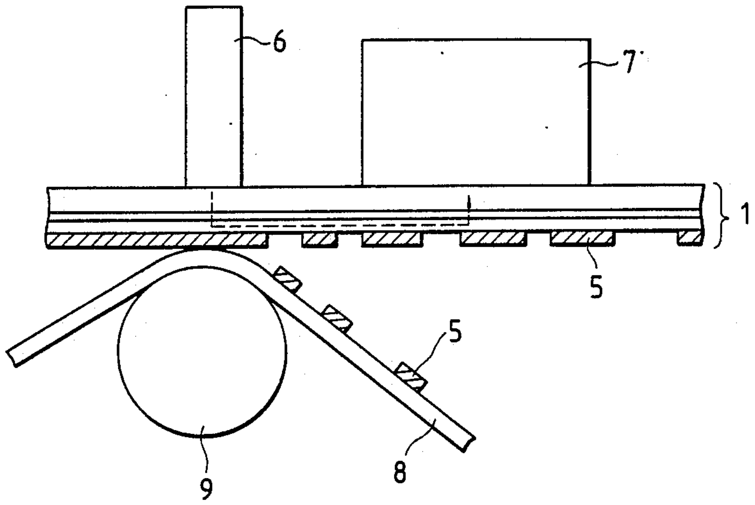
FIG. 2 is a schematic view showing the principle of recording of FIG. 1.
Figure 3:
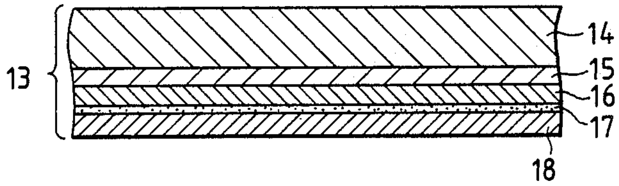
FIG. 3 is a sectional view of a current-conducting thermosensitive recording ink medium according to a first embodiment of the present invention.

Referring to FIG. 3, there is shown a structure of a current-conducting thermosensitive recording medium according to a first embodiment of the present invention. In the drawing the current-conducting thermosensitive recording medium 13 comprises an ink support 14, a thermogenetic resistor layer 15 provided thereon, a return electrode 16, an ink separating layer 17 and a heat-melting ink 18 which are stratified successively.

The ink support 14 is a sheet-shaped anisotropic support. Electrical conductivity in the direction of the thickness of the ink support 14 is ten or more times as large as electrical conductivity in the direction of the surface thereof. Preferably, the former is a thousand or more times as large as the latter. The value of resistance in the direction of the thickness of the ink support 14 is not larger than 100 $\Omega/mm^2$ and, preferably, not larger than 10 $\Omega/mm^2$. The ink support 14 has a thickness not less than 1 mm.

The thermogenetic resistor layer 15 is formed of a matter having a value of volume resistivity within a range of from $10^{-1}$ Ω.cm to $10^4$Ω.cm, preferably, from 10 Ω.cm to $10^3$Ω.cm. The thermogenetic resistor layer 15 has a thickness within a range of from 1000 Å to 20 μm, preferably, from 4000 Å to 1 μm.

To form a highly reliable and stable resistor film on the ink support 14, the thermogenetic resistor layer 15 must be 1000 Å thick or more, preferably, 4000 Å thick or more. On the other hand, from the view of efficiency in thermogenesis and thermal conductivity, the thermogenetic resistor layer 15 must be 1 μm thick or less. Accordingly, in order to heat the thermogenetic resistor layer 15 through a pulse current, it is preferable that the thermogenetic resistor layer 15 has a value of volume resistivity within a range of from 10 Ω.cm to 103 Ω.cm as described above. To improve durability greatly, the thermogenetic resistor layer 15 may contain at least one ruthenium IV compound. Preferred ruthenium IV compounds used herein are $RuO_2$, $Bi_2Ru_2O_7$ and the like.

The return electrode 16 is formed of a material having a value of volume resistivity not larger than one-tenth of the value of volume resistivity of the thermogenetic resistor layer 15. The material must have heat resistance against 200° C. or more.

Figure 4:
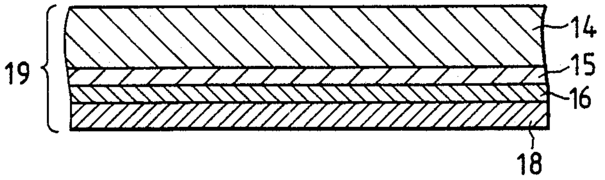
FIG. 4 is a sectional view of a conventional type current-conducting thermosensitive recording medium similar to FIG. 3 without an ink separating layer.

It is theoretically possible to construct the current-conducting thermosensitive recording ink medium as shown in FIG. 4 in which a current-conducting thermosensitive recording medium 19 having no ink separating layer 17 is formed. The ink separating layer 17 is a layer to facilitate and stabilize transfer of ink to a recording medium such as recording paper or the like. Use of the ink separating layer 17 eliminates scatter in the rate of ink transfer and thereby makes it possible to control recording density according to ink-transfer quantity modulation in which the quantity of ink transfer is changed by controlling impressed energy.

The ink separating layer 17 as shown in FIG. 3 has a surface tension which is lower than the critical surface tension γc in the surface of the recording medium such as recording paper. The thickness of the ink separating layer 17 is established to be as thin as possible. The thickness of the layer 17 is not larger than 10 μm, preferably, not larger than 1 μm. Preferably, the critical surface tension γc is 34 dyne/cm and the decomposing point is 200° C.

The preferred ink material forming the thermally melting ink layer 18 is a thermoplastic matter. The more preferred ink material is formed by mixing a coloring matter in a high molecular matter having a melting point of 200° C. or less and a glass transition point of 120° C. or less as a base ink material or by dissolving the coloring matter in the base ink material.

EXAMPLE 1-1

A current-conducting thermosensitive recording ink medium 13 was prepared as follows.

Nickel wires having a diameter of 15 μm were arranged within a 2 mm thick sheet of thermosetting silicon elastomer so that two nickel wires would exist in a unit area of 40 μm×40 μm chosen in a statistical manner from the sheet. The resulting sheet was polished, in the direction of the surface, to smoothen the surface (resulting in surface roughness not more than 2 μm). The value of resistance in the direction of the thickness of the support layer was 0.03 $\Omega/cm^2$. The value of resistance in the direction of the surface was $10^{14}$ $\Omega/cm^2$. The resulting sheet was sufficiently washed, dried and disposed in a vacuum system to form a vacuum of $1.0\times10^{-6}$ torr. Then an argon gas was introduced to the vacuum system to form a vacuum of $3\times10^{13}$ torr. The temperature of the base material was established to be 120° C.

A 2000 Å thick $RuO_2$-$ZrO_2$ thermogenetic resistor film was formed on the ink support 14 from a mixture target containing 70% by weight of $RuO_2$ and 30% by weight of $ZrO_2$ by a high-frequency sputtering film-forming method. The value of volume resistivity in the thus prepared thermogenetic resistor layer 15 was $2\times10^2$ Ω.cm.

The thermogenetic resistor layer 15 was coated with Al of the purity of 99.99% by weight by an electron beam evaporating deposition method in a destination vacuum of $2.0\times10^{-6}$ torr at a base material temperature of 150° C., thus to prepare a 5000 Å thick return electrode 16.

Thermosetting silicon resin was applied onto the return electrode 16 and hardened to prepare an ink separating layer 17 consisting of a 0.8 μm thick hardened film. The critical surface tension γc in the surface of the ink separating layer 17 was 29 dyne/cm and the decomposing point was 290° C.

An ink material formed by mixing/dispersing 3% by weight of red azo dye in polyacid resin having a softening point of 60° C. was applied onto the ink separating layer 17 to form a 4 μm thick thermally melting ink layer 18. Thus, a current-conducting thermosensitive recording ink medium 13 was produced.

Figure 5:
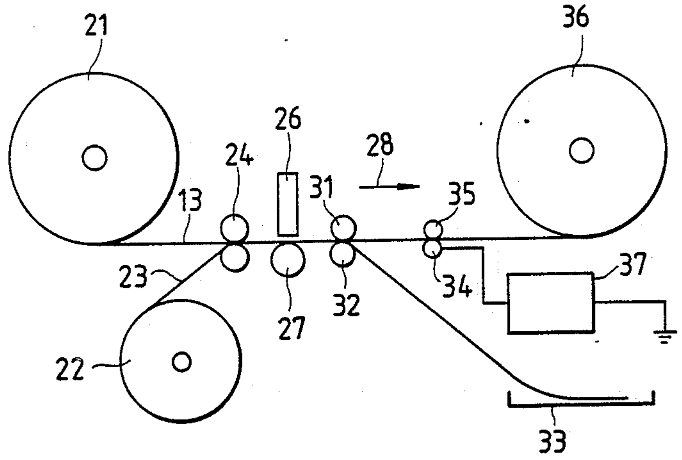
FIG. 5 is a schematic diagram of a recording apparatus using the current-conducting thermosensitive recording medium of FIG. 3.

FIG. 5 schematically shows a recording apparatus using the current-conducting thermosensitive recording ink medium according to this example. The apparatus has an ink medium roll 21 where a long current-conducting thermosensitive recording ink medium 13 is wound and a recording medium roll 22 where a long sheet of recording paper is wound.

The current-conducting thermosensitive recording ink medium 13 drawn out of the ink medium roll 21, and the recording paper 23 drawn out of the recording medium roll 22, are combined between a pair of feed rolls 24. The ink medium 13 and the recording paper 23 thus combined pass between a print electrode line head 26 and a backward-compression driving roll 27. The print electrode line head 26 is a recording head formed by arranging 75 μm-square copper electrodes in line with the pitch of 125 μm in a direction (principal scanning direction) perpendicular to the feeding direction (auxiliary scanning direction) of the current-conducting thermosensitive recording medium 13 and the like. Voltages to be applied to the square copper electrodes are controlled by the picture signal, so that a recording can be made. The pressure of the backward-compression driving roll 27 against the ink support 14 is 900 g/cm.

After recording, the ink medium 13 and the recording paper 23 pass between a pair of feed rolls 31 and 32 and then they are separated. The recording paper 23 is received by an exhaust tray 33. The current-conducting thermosensitive recording ink medium 13 passes between a pulse-impression electrode roll 34 and a pinch roll 35 and forms a used medium roll 36. The pulse-impression electrode roll 34 is arranged to be always in electrical contact with the return electrode 16 of the current-conducting thermosensitive recording ink medium 13. Therefore, the thermally melting ink layer 17 is not formed in opposite side portions of the current-conducting thermosensitive recording ink medium 13. In other words, the return electrode 16 is exposed at the side portions of the ink medium 13. The pulse-impression electrode roll 34 is connected to a pulse oscillator 37.

When the return electrode 16 is grounded so that the print electrode line head 26 is in contact with one surface of the ink support 14, a flow of current occurs as follows.

Print electrode line head 26→Ink support 14→Thermogenetic resistor layer 15→Return electrode 16.

Heat generated by the thermogenetic resistor layer 15 which is energized is transmitted as follows.

Thermogenetic resistor layer 15→Return electrode 16→Thermally melting ink layer 17→Recording paper 23.

The transmission of heat to the recording paper 23 is made by transferring melted ink in the thermally melting ink layer 17 onto the recording paper 23.

Pulses of 5V, 20V and 50V with the pulse width of 250 μS were successively applied to the print electrode line head 26 to thereby perform picture transfer onto ordinary paper as recording paper. At the same time, a reverse-polar pulse voltage of −3V with the pulse width of 300 μS from the pulse oscillator 37 was applied to the pulse impression electrode roll 34 synchronized with the picture signal impression.

The states of picture transfer are as shown in Table 1.

TABLE 1

| Impressed voltage | 5 V | 20 V | 50 V |
|---|---|---|---|
| State of Transfer | Starlike dot | Circular dot | Circular dot, slight disorder in the trace of the ink layer |
| Dot diameter on copying material | 83 μm | 68 μm | 105 μm |

EXAMPLE 1-2

Figure 6:
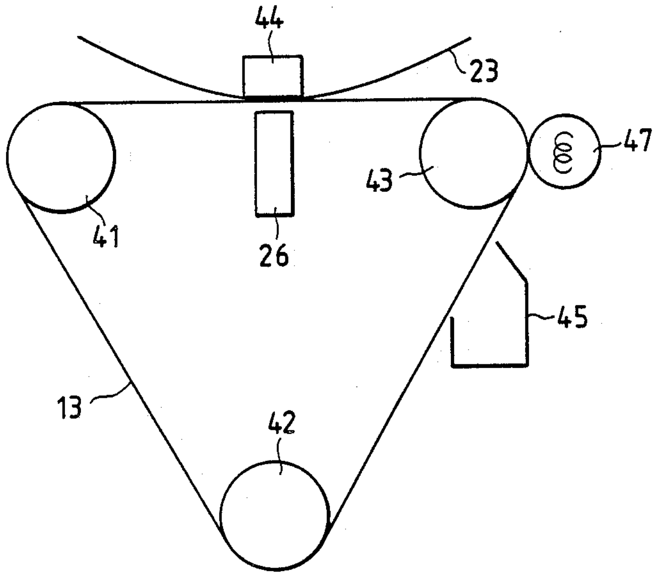
FIG. 6 is a schematic diagram of a recording apparatus by which reproduction of a thermally melting ink layer can be made.

FIG. 6 schematically shows a recording apparatus capable of reproducing the thermally melting ink layer. Like numerals in each of FIGS. 5 and 6 refer to like parts.

In this recording apparatus, three rotary rolls 41-43 are respectively arranged in three points of a triangle. An endless current-conducting thermosensitive recording ink medium 13 is put over these rolls. A print electrode line head 26 and an elastic backward-pressing member 44 are arranged between the first rotary roll 41 and the third rotary roll 43 so that the current-conducting thermosensitive recording ink medium 13 and the recording paper 23 can pass between the first 41 and third 43 rolls. The elastic backward-pressing member 44 has the same function as that of the backward-pressing driving roll 27 shown in FIG. 5. In other words, the elastic backward-pressing member 44 has the function of urging the current-conducting thermosensitive recording ink medium 13 and the recording paper 23 against the print electrode line head 26.

An ink replenishing device 45 is arranged between the second rotary roll 42 and the third rotary roll 43. The ink replenishing device 45 is a device for repeatedly applying ink to the thermally melting ink layer side surface of the current-conducting thermosensitive recording ink medium 13. For example, the device is composed of an ink tank containing ink melted by heating and an application roll soaked in the ink tank. A shaping roll 47 heated to a predetermined temperature is arranged opposite to the third rotary roll 43 to thereby smoothen the surface of applied ink.

While the thermally melting ink layer was replenished by the ink layer reproduction type recording apparatus, it was used for 1000 cycles. The printing results are shown in Table 2. It is apparent from Table 2 that satisfactory printing image can be attained in spite of the 1000 repetitions of use.

TABLE 2

| | First (20 V) | 100th | 500th | 1000th |
|---|---|---|---|---|
| State of Transfer | Circular dot | Circular dot | Circular dot | Circular dot |
| Dot diameter of copying material | 80 μm | 83 μm | 68 μm | 62 μm |

COMPARATIVE EXAMPLE 1

The same recording apparatus as in Example 1-2 was used. A resistor material containing 62% by weight of $ZrO_2$ and 38% by weight of Cu was used in the thermogenetic resistor layer of the current-conducting thermosensitive recording ink medium. The thermally melting ink layer was repeatedly used for 1000 cycles. The following results as shown in Table 3 were obtained.

TABLE 3

| | First (20 V) | 100th | 500th | 1000th |
|---|---|---|---|---|
| State of Transfer | Circular dot | Starlike circular dot | Circular dot | None |
| Dot diameter of copying material | 105 μm | 63 μm | 16 μm | None μm |

It is apparent from comparison between Table 3 and Table 2 that the use of ruthenium IV compounds is effective.

Second Embodiment

Figure 7:
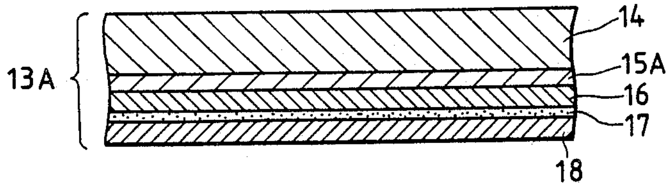
FIG. 7 is a sectional view of a current-conducting thermosensitive recording ink medium according to a second embodiment of the present invention.
Figure 8:
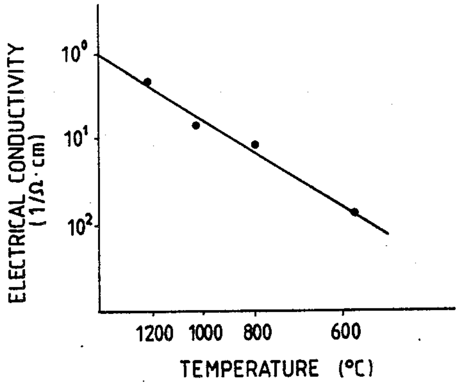
FIG. 8 is a graph showing the temperature characteristic of zirconium oxide.

FIG. 7 is a view for explaining a second embodiment of the present invention. In this embodiment, the thermogenetic resistor layer 15A of the current-conducting thermosensitive recording ink medium 13A is formed of zirconium oxide. As shown in FIG. 8, zirconium oxide has such a negative temperature coefficient where the value of resistance decreases with thermogenesis. Accordingly, impressed current is concentrated on a portion where thermogenesis occurs, so that the printing dot can be considerably prevented from spreading. As a result, minute temperature control in thermogenesis is not required and the production of a circuit for temperature control can easily be made. Further, contacting resistance between the ink support 14 and each needle electrode of the print electrode line head can be reduced. (It should be noted, however, that such a material having its temperature coefficient in the range of −2000 to +2000 is preferable for the material of the thermogenetic resistor layer of the present invention.)

The thermoqenetic resistor layer 15A formed of zirconium oxide gives large scope to thermal resistance. Because zirconium oxide is resistant to thermal impacts, large amounts of energy can be applied for a relatively short time. Accordingly, it is possible to employ various kinds of control means to control the printing.

The preferred thickness of the thermogenetic resistor layer 15A formed of zirconium oxide is from 100 Å to 3 μm. Specifically, the optimum thickness is from 800 Å to 2000 Å. Also by the use of the current-conducting thermosensitive recording ink medium 13A, a pulse signal in synchronism with a picture signal can be applied to the return electrode 16. Accordingly, reduction in total driving voltage, reduction in contacting resistance, and the like, can be attained so that there is an efficient use of energy. Further, reliability on recording process can be improved. Consequently, the recording ink medium 13A has a very large effect.

EXAMPLE 2-1

A current-conducting thermosensitive recording ink medium 13A was prepared as follows:

Carbon fibers having a diameter of 30 μm were arranged perpendicularly to a sheet of silicone elastomer in the density of one fiber per unit area of 50 μm×50 μm and fixed with the silicone elastomer. Then the resulting sheet was polished in the direction of the surface, resulting in a surface roughness of not more than 0.1 μm. The thickness of the sheet was established to be 2.5 mm. the value of resistance in the direction of the thickness of the ink support 14 as $5\times10^{-4}\Omega$.cm. The surface resistance was $10^{13}\Omega/\square$.

The ink support 14 wa sufficiently washed with organic solvent, dried and disposed in a vacuum system.

After a high vacuum of $1\times10^{-6}$ torr was formed, an argon gas was introduced to form a vacuum of $3\times10^{-12}$ torr. A 1500 Å thick thermogenetic resistor layer 15A of $ZrO_2$ was formed on one surface of the ink support 14 by a high-frequency sputtering method. A 3000 Å thick Cu film was applied onto the $ZrO_2$ film by a vacuum evaporating deposition method to form a return electrode 16. A 1 μm thick film of Teflon (polytetrafluoroethylene) was formed on the return electrode 16 by emulsion spreading. A 10 μm thick thermally melting ink layer 18 formed by mixing/dispersing 5% by weight of carbon black in polyethylene wax having a melting point of 80° C. was provided on the ink separating layer.

The print electrode line head (refer to FIG. 5) was brought into contact with an ink support side surface of the current-conducting thermosensitive recording ink medium thus prepared. The print electrode line head 26 has needle electrodes arranged in line in the density of 8/mm. While voltages of 25V, 40V and 80V were successively applied to the print electrode line head 26, printing operations were made by the same recording apparatus as in FIG. 5 using 80 μS wide impression pulse. In synch with the 25 pulse, a −10V pulse was applied to the return electrode 16. The results are shown in Table 4.

TABLE 4

| Driving voltage | 25 V | 40 V | 80 V |
|---|---|---|---|
| Printing Condition | Good | Good | Good |
| Dot diameter | 40 μm | 50 μm | 80 μm |

COMPARATIVE EXAMPLE 2

The same ink support as in Example 2-1 was used except that the thermogenetic resistor layer and the thermally melting ink layer were formed of $SiO_2$ and 90 Å thick ink medium, respectively. Printing operations were made in the same manner as that of Example 2-1. The following results as shown in Table 5 were obtained.

TABLE 5

| Driving voltage | 25 V | 40 V | 50 V |
|---|---|---|---|
| Printing Condition | No printing | Ink transfer at fine point | Ink transfer at fine point |
| Dot diameter | | About 40 μm | 50 μm point dispersion |

EXAMPLE 2-2

A current-conducting thermosensitive recording ink medium 13A was prepared as follows:

30% by weight of Ni balls with the mean particle diameter of 8 μm were dispersed into silicone resin to form a sheet. The silicone resin was thermally hardened with pressure of 2 $Kg/cm^2$ applied to the silicone resin from the upper surface before the Ni balls were stuck to the silicone resin. Thus, a sheet-shaped member was prepared. The sheet-shaped member was polished to smoothen its surface to obtain surface roughness not larger than 0.1 μm in the direction of the surface. Thus, an ink support 14 was prepared.

The ink support 14 was disposed in a high vacuum of $10^{-6}$ torr. Then an argon gas was introduced into the vacuum to form a vacuum of $3\times10^{-3}$ torr. A 200 Å thick thermogenetic resistor layer 15A of $ZrO_2$ was formed on one surface of the ink support 14 in the film-forming rate of 500 Å per hour by a high-frequency sputtering method. A 500 Å Cr film was applied onto the $ZrO_2$ film by the sputtering method in the same condition as described above. A 3000 Å thick Cu film was further applied onto the Cr film by a vacuum evaporating deposition method, thus to prepare a return electrode 16. A 1 μm thick ink separating layer 17 of silicone resin was applied onto the return electrode 16. Thermally melting ink formed by mixing/dispersing 5% by weight of carbon black in polyethylene wax having a melting point of 80° C. was applied onto the ink separating layer 17 to from a 10 μm thick film.

The same printing test as in Example 2-1 was conducted using the current-conducting thermosensitive recording ink medium 13A. The following printing results as shown in Table 6 were obtained.

TABLE 6

| Driving voltage | 25 V | 40 | 80 V |
|---|---|---|---|
| Printing condition | Good but slightly star- | Good but slightly star- | Good |

TABLE 6-continued

| Driving voltage | 25 V | 40 | 80 V |
|---|---|---|---|
| Dot diameter | like transfer 20 μm | like transfer 40 μm | 60 μm |

Third Embodiment

Figure 9:
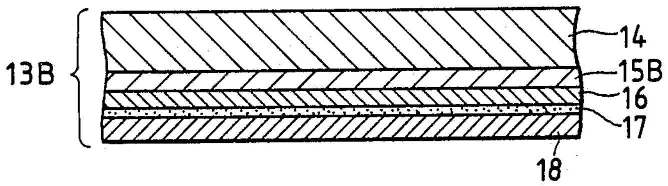
FIG. 9 is a sectional view of a current-conducting thermosensitive recording medium according to a third embodiment of the present invention.

FIG. 9 is a view of explaining a third embodiment of the present invention. In this embodiment, the thermogenetic resistor layer 15B of the current-conducting thermosensitive recording ink medium 13B is formed of a matter having a value of volume resistivity within a range between $10^{-1}$ and $10^4$Ω.cm.

If the thermogenetic resistor layer 15B has a value of volume resistivity not smaller than $10^4$Ω.cm, the layer 15B becomes thinner than 1000 Å to thereby make it difficult to control the film thickness at the time of production of the layer 15B. Further, considerable accuracy is required of the surface smoothness of the subbing layer under the thermogenetic resistor layer. There arise problems in scatter of the value of resistance, deterioration of insulation of the resistor, and the like.

If the thermogenetic resistor layer 15B has a value of volume resistivity not larger than $10^{-1}$Ω.cm, a large amount of leak current arises in the thermogenetic resistor layer 15B as well as the layer 15B becoming thicker as to reduce efficiency in heating ink.

When the thermogenetic resistor layer 15B is formed of a matter having a value of volume resistivity within a range between $10^{-1}$ and $10^4$Ω.cm, the thickness of the layer 15B is established to be within a range from 1000 Å to tens μm. In general, thin films having a thickness within ranges which can be easily produced by sputtering or vacuum evaporating deposition. Further, scatter of thickness can be reduced when such films are produced.

According to the third embodiment, the ink support 14 of the current-conducting thermosensitive recording ink medium 13B is formed of an anisotropic matter resulting in energy savings in printing. For example, printing can be made by use of 500 erg/dot or less printing energy and at a high speed of 500 μS/dot or less. The thermally melting ink layer 18 can be formed of a suitably selected ink material as long as the ink material has coloring thermoplastic property (thermally melting property). There is large scope for the selection of ink material.

EXAMPLE 3

A current-conducting thermosensitive recording ink medium 13B was prepared as follows.

Copper wires having a diameter of 15 μm were arranged within a 2 mm thick sheet of room-temperature thermosetting silicone elastomer so that nine copper wires would exist in a unit area of 100 μm×100 μm chosen in a statistical manner from the sheet. The resulting sheet was polished in the direction of the surface so that surface roughness was not larger than 400 Å . The value of resistance in the direction of the thickness of the ink support 14 was not higher than 0.1Ω. The value of resistance in the direction of the surface was not less than $10^{13}$Ω.

The ink support 14 thus prepared was sufficiently washed and disposed in a vacuum of $3.0\times10^{-3}$ torr formed by introduction of an argon gas. In the vacuum condition, a sputtering was made by a high-frequency sputtering film-forming method using a mixing target formed by mixing 1% by weight of Cu in $ZrO_2$. Thus, a 3000 Å thick thermogenetic resistor layer 15B having a value of volume resistivity of $10^2$Ω.cm was prepared.

The thermogenetic resistor layer 15B was successively coated with a 500 Å thick Cr film and a 2000 Å thick Al film by a vacuum evaporating deposition method in a destination vacuum of $1.0\times10^{-6}$ torr to thereby prepared a return electrode 16. A 2 μm thick film of Teflon (polytetrafluoroethylene) resin was formed on the return electrode 16 to prepare an ink separating layer 17. A thermally melting ink layer 18 was formed on the ink separating layer 17. The thermally melting ink layer 18 comprises of an ink material formed by mixing 3% by weight of phthalocyan dye in polyester resin having a glass transition point of 55° C. The thickness of the layer 18 was 3 μm.

A print electrode line head (refer t FIG. 5) was brought into contact with the ink support side surface of the current-conducting thermosensitive recording ink medium 13B thus prepared. The print electrode line head 26 has needle electrodes arranged in line in the density of 8/mm. The needle electrodes are in contact with the current-conducting thermosensitive recording ink medium 13B under pressure of 1.0 Kg/cm².

While voltages of 5V, 20V and 40V were successively applied to the print electrode line head 26, printing operations were made by the same recording apparatus as in FIG. 5 using a 80 μS wide impression pulse. In synchronism with the pulse, a reverse-polar pulse of −10V was applied to the return electrode 16. The backward-pressing driving roll (Refer to FIG. 5) was a rubber roll having a rubber hardness of 42 degrees. Available copying paper (type L copying paper sold by Fuji Xerox Co., Ltd.) was used as recording paper.

The results of the printing test are shown in Table 7.

TABLE 7

| Impressed voltage | 5 V | 20 V | 40 V |
|---|---|---|---|
| State of Transfer | Circular form | Circular form | Depressed star like form |
| Dot diameter | 60 μm | 120 μm | 180 μm |

COMPARATIVE EXAMPLE 3

The same recording apparatus as in Example 3 was used. The return electrode 15B of the current-conducting thermosensitive recording ink medium 13B was formed of a mixture of Ta and $SiO_2$. The value of volume resistivity in the mixture was 10Ω.cm. The thickness of the return electrode 15B was established to be 0.4 μm. The printing results are shown in Table 8.

TABLE 8

| Dot | Impressed voltage | | |
|---|---|---|---|
| condition | 5 V | 20 V | 40 V |
| State of ink Transfer | No transfer | Starlike form | Elliptical form |
| Dot diameter | | 60 μm | 120 μm |

Fourth Embodiment

Figure 10:
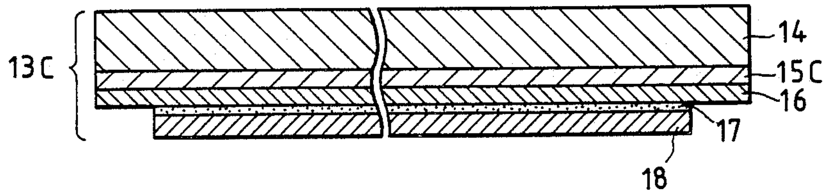
FIG. 10 is a sectional view in the direction of the width of a current-conducting thermosensitive recording ink medium according to a fourth embodiment of the present invention.

FIG. 10 shows a structure of a current-conducting thermosensitive recording ink medium as a fourth embodiment of the present invention. The current-conducting thermosensitive recording ink medium 13C which is similar to the ink medium of FIG. 3, comprising an ink support 14, a thermogenetic resistor layer 15C, a return electrode 16, an ink separating layer 17 and a thermally melting ink layer 18, the layers being laminated on one surface of the ink support successively.

The ink support 14 is formed of an anisotropic electric conductor. Electrical conductivity in the direction of the thickness of the ink support 14 is ten times or more as large as electrical conductivity in the direction of the surface thereof. Preferably, the former is 1000 times or more as large as the latter. The value of resistance in the direction of the thickness of the ink support 14 is not larger than $100\Omega/mm^2$, preferably, not larger than $10\Omega/mm^2$. The thickness of the ink support 14 is required to be not smaller than 1 μm.

The thermogenetic resistor layer 15C is formed of a matter having a value of volume resistivity within a range of from $10^{-1}$ Ω.cm to $10^3$Ω.cm. The thermogenetic resistor layer 15C has a thickness within a range of from 1000 Å to 20 μm, preferably, from 4000 Å to 1 μm. It is desirable that the thermogenetic resistor layer 15C has a value of volume resistivity within a range from 10Ω.cm to $10^3$Ω.cm.

The return electrode 16 is formed of a material having a value of volume resistivity not larger than one-tenth of the value of volume resistivity of the thermogenetic resistor layer 15C. The material must have heat resistance against 200° C. or more.

The ink separating layer 17 has a surface characteristic in which the surface tension is lower than critical surface tension $\gamma c$ in the surface of the recording medium such as recording paper. The ink separating layer 17 is established to be as thin as possible. The thickness of the layer 17 is not more than 10 μm, preferably, not more than 1 μm. Preferably, the critical surface tension $\gamma c$ is 38 dyne/cm.

The preferred ink material forming the thermally melting ink layer 18 is a thermoplastic matter. The more preferred ink material is formed by mixing a coloring matter in a high molecular matter having a melting point of 200° C. or less and a glass transition point of 120° C. or less as a base ink material or by dissolving the coloring matter in the base ink material.

In this embodiment, opposite end portions of the return electrode 16 in the current-conducting thermosensitive recording ink medium 13C are exposed respectively by a width of about 1 cm. In other words, the ink separating layer 17 and the thermally melting ink layer 18 are not provided on the opposite end portions of the return electrode 16.

Accordingly, the width (length in the main scanning direction) of the current-conducting thermosensitive recording ink medium 13C is enlarged by the exposed width of the return electrode 16. In the conventional thermal transfer recording apparatus using an ink donor film as a thermal recording medium, the ink donor film is established to be very thin. Accordingly, the mechanical strength of the ink donor film is unsatisfactory. In the case where the width of the ink donor film is so enlarged, there often arises a problem in crumpling or meandering.

However, in the current-conducting thermosensitive recording ink medium 13C of this embodiment, an anisotropic strong sheet member is used as a ink support 14. Accordingly, the ink medium can be established to be thick to some degree, so that the ink medium can have a considerably large mechanical strength. Accordingly, there is no possibility of crumpling or meandering during the recording operation, though the width of the current-conducting thermosensitive recording ink medium 13C is enlarged to some degree. Uneveness or blur of printed ink does not occur.

Figure 11:
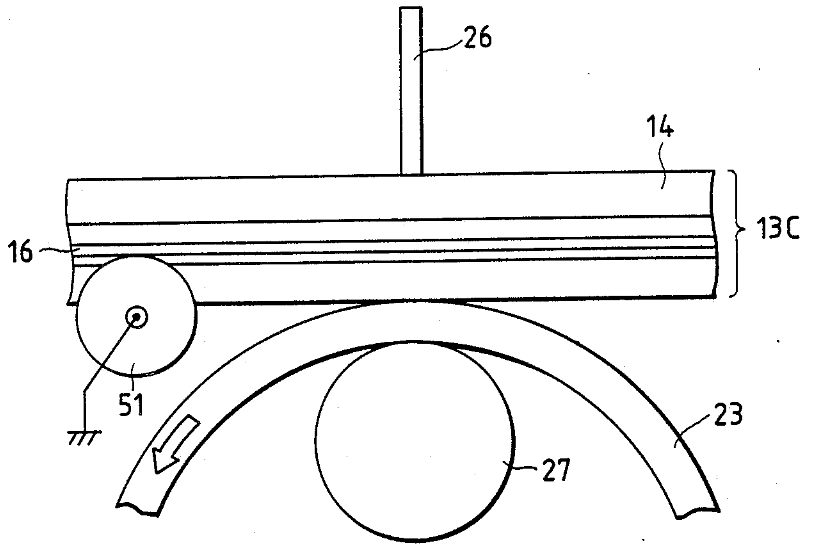
FIG. 11 is a schematic view showing the principle of recording where the current-conducting thermosensitive recording ink medium of FIG. 10 is used.
Figure 12:
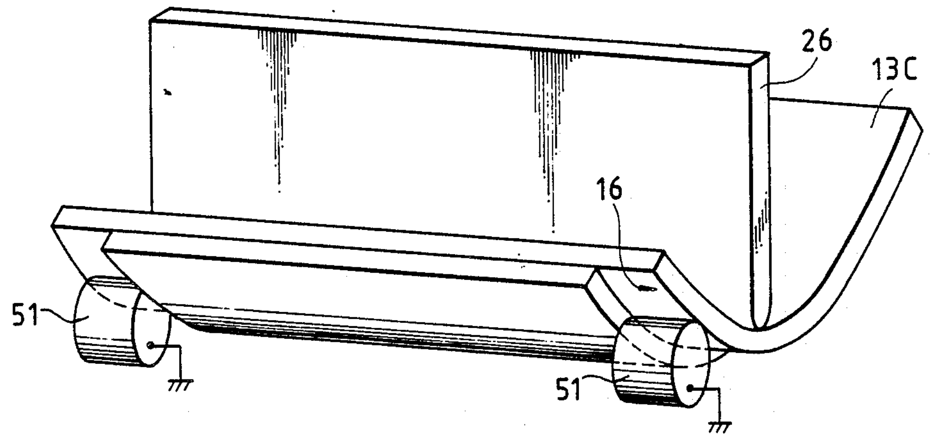
FIG. 12 is a perspective showing important parts in a recording portion of FIG. 10.

FIG. 11 shows important parts of a recording apparatus using the current-conducting thermosensitive recording ink medium 13C. By the recording apparatus, the print electrode line head 26 is brought into contact with the ink support 14 side surface of the current-conducting thermosensitive recording ink medium 13C in a predetermined amount of pressure. The recording paper 23 which is put on the current-conducting thermosensitive recording ink medium 13C passes between the backward-pressing driving roll 27 and the print electrode line head 26. A pair of electrically conductive rolls 51, 51 as shown in FIG. 12 are arranged at the opposite ends of the current-conducting thermosensitive recording ink medium 13C so that the rotating rolls 51, 51 are in contact with the surface of the return electrode 16. The return electrode 16 is grounded through the electrically conductive rolls. Of course, a predetermined bias voltage may be applied to the electrically conductive rolls 51, 51. Or a pulse of a predetermined voltage may be applied to the rolls in synchronism with the impression of picture signal. Further, the electrically conductive rolls 51, 51 may be replaced by metal springs.

As described above, in accordance with the embodiments (from the first embodiment to the fourth embodiment) of the present invention, the current-conducting thermosensitive recording ink medium comprises: a stratified ink support in which the electrical conductivity in the direction of the thickness of the ink support is larger than the electrical conductivity in the direction of the surface; a thermogenetic resistor layer for producing heat by current conduction; an electrode layer electrically connected to said thermogenetic resistor layer; and a thermally melting ink layer to be melted by thermogenesis of the thermogenetic resistor layer, the layers being laminated on the ink support in that order.

Printing using the current-conducting thermosensitive recording ink medium has the following advantages.

(1) Printing can be made by low energy.

Because an electric current unidirectionally flows in the thermogenetic resistor layer of the current-conducting thermosensitive recording ink medium, good efficiency can be attained. For example, when recording is made in the density of 8 degree/mm, the energy required for recording is from 300 to 1000 erg per one degree.

As printing can be made by such low energy, printing speed can be improved. Because thermogenesis does not depend on transmission of thermal pulse rather it depends on the electric current, the printing speed can also be improved. The quantity of time delay required for printing is 100 μS, or less, per one picture element (dot).

(2) Color reproduction is good.

Because the thermally melting ink layer need not serve as a current path, there is large scope of selection of ink. Further, a transparent high molecular material can be selected easily. Accordingly, color control of ink is simplified and, at the same time, color characteristic is stabilized.

Because coloring material is contained in the plastic material in the current-conducting theremosensitive recording ink medium of this invention, the coloring material is not directly exposed to intensive light. Furthermore, the coloring material is less likely to decompose by oxidation/reduction due to oxygen and the like. In short, a picture results which is excellent in the solidness of the coloring material. The solidness is comparable to that of a picture in the field of presswork or electronic photography using structurally similar ink.

The current-conducting thermosensitive recording ink according to the present invention has a relatively larger field for the selection of the coloring material compared with that available in the field of presswork. From this point of view, the color tone of the picture attained according to the invention is equal to or superior than that attained by presswork.

(3) Tone expression is good.

Because the current-conducting thermosensitive recording ink medium has a good response to the input signal, the quantity of ink to be transferred to recording paper or the like can be adjusted by the modulation of the input signal. Accordingly, multistageous tone expression can be made without use of dummy middle-tone expression due to dither matrix or the like and by directly changing the printing dot diameter. Accordingly, a picture can be reproduced by high-resolution picture elements. Further, full-color reproduction can be made by middle-tone expression equal to that in presswork.

Reproduction of 4–16 middle tones per dot can be made in the resolution (printing density) of 8–16 dots/mm.

(4) The ink medium itself is mechanically strong.

The ink medium is difficult to break and thus results in improved reliability of the recording apparatus. Accordingly, the ink medium can be repeatedly used by applying thermally melting ink repeatedly. Because the signal-impression electrode can be brought into contact with the ink medium with a considerable amount of pressure, irregularity does not occur in recording. Further, a material such as ruthenium and the like can be used in the thermogenetic resistor layer. Accordingly, not only durability against pulse voltage can be improved but also weather resistance can be improved. For example, the current-conducting thermosensitive recording ink medium according to the present invention has weather resistance of from 10% Rh to 90% Rh in the environmental temperature of 0° C. to 40° C., so that high-reliable printing operations can be made.

Fifth Embodiment

The fifth embodiment of the present invention provides a thermal transfer recording medium in which ink supported by a support and containing a thermoplastic high molecular matter as a main component is heated to be transferred onto a recording material, the support comprising of: an anisotropic electrically conductive layer in which electrical conductivity in the direction of the thickness is established to be ten times or more as large as electrical conductivity in the direction of the width; a thermogenetic resistor layer having volume resistivity within a range between $10^{-2}\Omega$.cm and $10^{3}\Omega$.cm per unit sectional area; a return electrode layer having volume resistivity not more than one-tenth of the volume resistivity specific of the thermogenetic resistor layer; and an ink separating layer for carrying ink thereon; the thermogenetic resistor layer, the return electrode layer and the ink separating layer being laminated on the anisotropic electrically conductive layer in that order.

In the thermal transfer recording medium, a current is passed through the anisotropic electrically conductive layer in the direction of the thickness from needle electrodes being in contact with the anisotropic electrically conductive layer toward the thermogenetic resistor layer. The thermogenetic resistor layer is a layer for generating heat produced by the current to transfer ink. The return electrode layer serves as an electrode for dispersing the current flowing in the thermogenetic resistor layer and for circulating the current. The ink separating layer has critical surface tension adjusted to make ink transfer due to low energy easy.

By the aforementioned construction, high-efficient and high-quality recording can be attained at a high speed.

Figure 13:
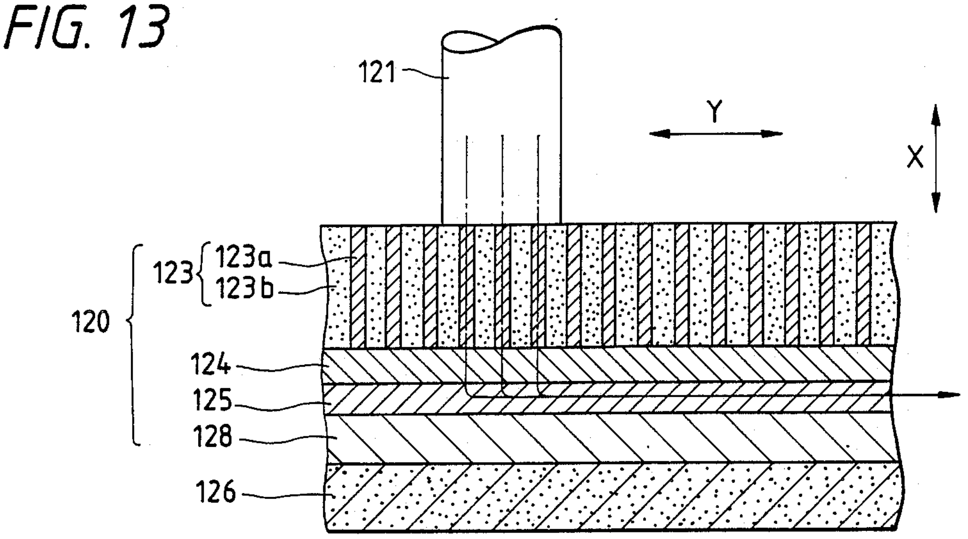
FIG. 13 is a sectional view of a thermal-transfer recording medium according to the fifth, sixth, and seventh embodiments.

FIG. 13 is a vertical sectional view showing a typical structure of the thermal transfer recording medium according to the embodiments (fifth embodiment through seventh embodiment) of the present invention.

The thermal transfer recording medium has a support 120 and an ink layer 126 formed on the support 120. The support 120 is constituted by an anisotropic electrically conductive layer 123 in which electrical conductivity in the direction (of the arrow X) of the thickness is higher than electrical conductivity in the direction (of the arrow Y) of the width, a thermogenetic resistor layer 124, a return electrode 125, and an ink separating layer 128.

Figure 14:
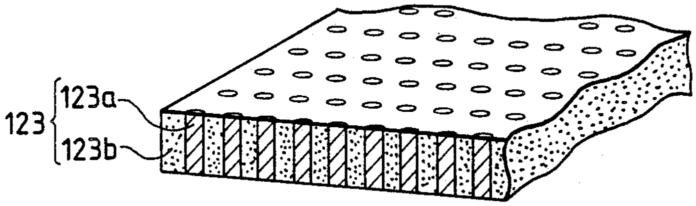
FIG. 14 is a partly cutaway perspective view of an anisotropic electrically conductive layer in the recording medium of FIG. 13.

Preferably, electrical conductivity in the thickness of the anisotropic electrically conductive layer is ten times or more as large as electrical conductivity in the direction of the width thereof. For example, as shown in FIG. 14, the anisotropic electrically conductive layer 123 is composed of electrically conductive linear matters 123*a*, such as nickel wires, arranged in parallel to each other in the direction of the thickness, and elastic resin 123*b*, such as silicone elastomer, the linear matters 123*a* being fixed with the elastic resin 123*b* by molding.

The value of resistance in the direction of the thickness of the anisotropic electrically conductive layer 123 is established to be not larger than 200Ω, preferably, not more than 20Ω.

The thermogenetic resistor layer 124 is formed of a matter having thermal resistance against 20020 C. or more. For example, the layer 124 is formed of ceramics such as TaN and the like. The volume resistivity of the layer 124 is established to be within a range between $10^{-2}\Omega$.cm and $10^{4}\Omega$.cm, preferably, within a range between 10Ω cm and $10^{3}\Omega$.cm. Preferably, the thickness of the layer 124 is established to be within a range between 3000 Å and 20 μm on consideration of the mechanical strength of the support.

If the volume resistivity of the thermogenetic resistor layer 124 having a thickness within the defined range is over the aforementioned range, high-voltage driving is required to attain the feeding current necessary for thermogenesis, resulting in lowered reliability as measured against durability against voltage in electric circuits or other portions. On the other hand, if the volume resistivity of the thermogenetic resistor layer 124 is below the aforementioned range, large current supply for thermogenesis is required, so that an increase of cost is induced by an increase of circuit size.

The return electrode layer 125 is formed of electrically conductive metal by an evaporating deposition method or the like. The volume resistivity of the return electrode layer 125 is $\times 10^{-1}$ times, or less, as large as that of the thermogenetic resistor layer 124. Preferably, the former volume resistivity is $1\times10^{-1}$ times, or less, as large as the latter volume resistivity. The material used in the layer 125 has thermal resistance against 200° C. or more. The return electrode layer 125 is connected to the ground through an electrode not shown or is connected to an electrode having a predetermined bias voltage.

It is preferable that the ink separating layer 128 is a very thin film formed of a material having lower critical surface tension than critical surface tension (γc) in the surface of the recording medium such as recording paper, in order to facilitate ink transfer. The thickness of the layer 128 is established to be not larger than 10 μm, preferably, not larger than 1 μm.

The ink layer 126 formed by mixing a coloring matter in a high molecular matter having a glass transition point of 130° C. or less as a base ink material or by dissolving the coloring matter in the base ink material.

Figure 15:
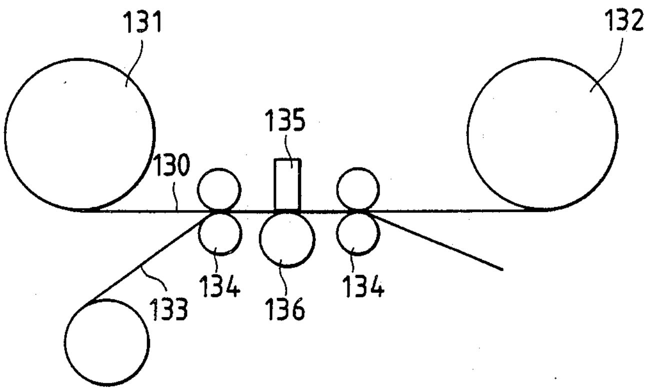
FIG. 15 is a schematic diagram of a recording apparatus using such a thermal-transfer recording medium of FIG. 13.

FIG. 15 schematically shows a recording apparatus using the thermal transfer recording medium.

The thermal transfer recording medium 130 is fed from the supply reel 131 to the take-up reel 132. The recording paper 133 which is put on the thermal transfer recording medium 130 is moved between a pair of feed rollers 134. The recording head 135 having needle electrodes 121 (FIG. 13) arranged in line catches the thermal transfer recording medium 130 and the recording paper 133 between the backward elastic roller 136 and itself in the center line between the pair of feed rollers 134, so that a recording electric pulse is applied.

When, for example, an electric pulse is applied to a certain needle electrode 121 being in contact with the anisotropic electrically conductive layer 123, the signal current flows in the needle electrode 121, the thermogenetic resistor layer 124 and the return electrode layer 125 in the order as shown by the dot-and-dash line in FIG. 13. The X-direction electrical resistance of the anisotropic electrically conductive layer 123 is very low. Because the current is dispersed in the return electrode layer 125, the electrical resistance of the return electrode layer 125 is also low. Accordingly, a large part of electrical energy supplied from the needle electrode 121 is converted to thermal energy in the thermogenetic resistor layer 124.

The heat is transmitted to the ink layer 126 through the return electrode layer 125 and the ink separating layer 128. Thus, ink in the ink layer is melted by the heat so that the melted ink is transferred to recording paper or the like. Because the return electrode layer 125 and the ink separating layer 128 are both very thin, the heat transmission speed is fast and energy loss can be reduced substantially.

According to the aforementioned construction of the thermal transfer recording medium, effective energy used for recording is 15% or more of the input energy, so that very high efficiency in recording can be attained. Accordingly, supply energy for recording is not greater than 500 erg per dot. Further, recording can be made at a high speed of 500 μsec/dot or less.

Efficiency in ink transfer is improved by the provision of the ink separating layer 128. Accordingly, the quantity of dot transfer can be changed by modulation of the input energy; thereby making a multistageous-tone recording possible.

EXAMPLE 5-1

Parts for the thermal transfer recording medium as shown in FIG. 13 were prepared as follows.

(1) Anisotropic Electrically Conductive Layer 123

Nickel wires having a diameter of 15 μm and coated with gold by evaporation plating were arranged in parallel to each other in such density that at least one nickel wire would exist in an area of 40 μm×40 μm chosen in a statistical manner. Then the nickel wires were fixed with room-temperature thermosetting silicone elastomer by molding, to prepare an anisotropic electrically conductive layer. The surface of the anisotropic electrically conductive layer was polished so that the surface accuracy would be not less than 300 Å. The thickness of the layer was 2 mm. The value of resistance per unit area in the direction of the thickness (in the X-direction of FIG. 13) was 0.7Ω. The value of the resistance in the direction of the surface (in the Y-direction of FIG. 13) was $10^{14}$ Ω.

(2) Thermogenetic Resistor Layer 124

The anisotropic electrically conductive layer prepared in the above paragraph (1) was sufficiently washed, dried and disposed in a vacuum system of a vacuum of $2\times10^{-6}$ torr. Then an argon gas was introduced to the vacuum system to form a vacuum of $3\times10^{-3}$ torr. Then a 2500 Å thick thermogenetic resistor layer having a value of resistance of 80 $\Omega/10^{-2}$ $mm^2$ was formed on the anisotropic electrically conductive layer 123 by a high-frequency sputtering method using a TaN target containing 20% by weight of $SiO_2$.

(3) Return Electrode Layer 125

The sheet obtained in the above paragraph (2) was coated with a 500 Å thick Cr film and a 2000 Å thick Cu film, successively, in a destination vacuum of $1.5\times10^{-6}$ torr by an electron beam vacuum evaporating deposition method to thereby prepare a return electrode layer.

(4) Ink Separating Layer 128

A 3 μm thick polyfluoroethylene resin film was sintered on the return electrode layer to prepare an ink separating layer. The critical surface tension of the ink separating layer was 20 dyne/cm.

(5) Ink Layer 126

A 10 μm thick thermoplastic magenta ink layer formed by mixing 15% by weight of Lithol red (strontium salt) dye in polyester resin (Bylon 200: TOYOBO Co., Ltd.) was applied onto the ink separating layer.

The thermal transfer recording medium thus prepared was set in an apparatus as shown in FIG. 3. Then a recording was made by the apparatus using a line head having 90 μm-diameter needle electrodes arranged in the density of 8/mm. Recording electrical pulses of 15V, 40V, 80V and 150V were used respectively as a rectangular pulse having a width of 150 μm. Ordinary copying paper was used as recording paper. The thermal transfer recording medium and the recording paper were put between the backward elastic roller having a rubber hardness of 45 degrees and the line head while the line head was pressed to the backward elastic roller under a pressure of 800 g/$cm^2$, so that a recording was made. Electrodes were connected to the return electrode layer 125 to make it possible to apply a 30V rectangular pulse having a pulse width of 120 μS continuously.

After a thermal transfer recording was made in response to the picture signal, the transfer dot (recording dot) was estimated.

TABLE 9

| | Electric pulse voltage | | | |
|---|---|---|---|---|
| Characteristic | 15 V | 40 V | 80 V | 150 V |
| State of transfer | Slightly broken to pieces | Good circular dot | Good circular dot | Slightly starlike dot |
| Dot diameter | 65 μm | 100 μm | 140 μm | 190 μm |

COMPARATIVE EXAMPLE 5-1

A thermal transfer recording medium was prepared in the same manner as Example 5-1, except that the ink separating layer in Example 5-1 was not formed in Comparative Example 5-1. The same recording was made to estimate the transfer dot. The critical surface tension in the Cu surface (which was in contact with the ink layer) of the return electrode layer was 62 dyne/cm.

TABLE 10

| | Electric pulse voltage | | | |
|---|---|---|---|---|
| Characteristic | 15 V | 40 V | 80 V | 150 V |
| State of transfer | No transfer | No transfer | Nebular transfer Bad. | Broken to pieces. Nebular transfer. |
| Dot diameter | — | — | 90 μm | 130 μm |

It is apparent in comparison with Table 9 that the ink separating layer has a great influence on ink transfer.

COMPARATIVE EXAMPLE 5-2

A thermal transfer recording medium was prepared in the same manner as Example 5-1, except that a 200 Å thick thermogenetic resistor layer was formed by sputtering only $SiO_2$. The recording medium was estimated in the same manner as Example 5-1.

TABLE 11

| Electric pulse width | | Electric pulse voltage | | | |
|---|---|---|---|---|---|
| | Characteristic | 15 V | 40 V | 80 V | 150 V |
| 120 msec | State of transfer | No trans. | No trans. | No trans. | No trans. |
| 20 msec | State of transfer | No trans. | No trans. | Broken circular dot | Slighty broken circular dot |
| | Dot diameter | — | — | 80 m | 110 m |

When the electric pulse width was sufficiently larger than that in Example 5-1, a recording can be made. Because $SiO_2$ is an insulator, it can be considered that the recording depends on the thermogenesis of the return electrode layer.

COMPARATIVE EXAMPLE 5-3

A thermal transfer recording medium was prepared in the same manner as Example 5-1, except that the anisotropic electrically conductive layer 23 in Example 5-1 was replaced by another electrically conductive layer formed by dispersing 30% by weight of carbon in silicone elastomer to give electrical conductivity. The thickness of the layer was 2 mm. The value of resistance in the direction of the thickness was 110 Ω.

TABLE 12

| | Electric pulse voltage | | | |
|---|---|---|---|---|
| Characteristic | 15 V | 40 V | 80 V | 150 V |
| State of transfer | No transfer | No transfer | No transfer | No transfer |
| Dot diameter | — | — | — | — |

In Comparative Example 5-3, energy loss was very large. The reason was that a sufficiently large quantity of electric current to heat ink was not fed to the thermogenetic resistor layer.

Sixth Embodiment

The sixth embodiment of the present invention provides a thermal transfer recording medium in which ink supported by a support and containing a thermoplastic high molecular matter as a main component is heated to be transferred onto a recording matter to thereby perform recording, the support having an ink separating layer on its side where the ink is carried, the ink separating layer being provided so that critical surface tension in an ink carrying surface thereof is established to be not more than 38 dyne/cm.

Preferably, the support is composed of: a return electrode layer; an ink separating layer; a thermogenetic resistor layer; and an anisotropic electrically conductive layer in which electrical conductivity in the direction of the thickness is more than electrical conductivity in the direction of the width, the return electrode layer, the thermogenetic resistor layer and the anisotropic electrically conductive layer being provided on a lower surface of the ink separating layer in that order.

The subject of the sixth embodiment according to the invention is in that the surface energy in the ink-layer-carrying surface of the ink support is varied to be suitable for ink transfer and the process of ink transfer. Because the surface energy in the ink carrying surface is the largest factor for ink transfer, the value thereof determines whether thermally melting ink can be transferred or not. When the surface energy is controlled so not to exceed 38 dyne/cm, not only is ink transfer completed but excessive thermogenesis is prevented. If the critical surface tension of the ink separating layer is within the range of 38–50 dyne/cm, bad transfer occurs or a large amount of energy is undesirably required for heating ink sufficiently to induce ink transfer. If the critical surface tension of the ink separating layer is not less than 50 dyne/cm, ink transfer hardly occurs so that the ink transfer rate is not more than 30% by weight. The surface energy of the ink support can be controlled by a method using the wet characteristic of thermally melted ink. This method is applicable to any suitable process as long as the process deals with the transfer of thermally melted ink.

In the aforementioned construction of the invention, a high-efficient and high-quality recording can be made at a high speed.

The basic construction of the thermal transfer recording medium in the sixth embodiment is the same as that in the fifth embodiment. FIG. 13 is a vertical sectional view showing the basic construction. This embodiment is characterized in the following points.

In the case where ink is transferred to reproduce a recording picture, the force of transfer is greatly affected by adsorptive force due to wetness of ink as related to the difference between the surface energy of the ink support being in contact with the ink layer and the surface energy of the copying material. The mutual surfaces competes for thermally melted ink, on the basis of the wetness of ink. As this result, ink is deposited on the surface having the larger adsorptive force. In other words, ink is deposited on the surface having the larger surface energy. Thus, formation of a picture can be carried out. From the viewpoint of such a transfer mechanism, the surface energy (almost equal to the critical surface tension) in the ink separating layer surface of the ink support is determined to be not larger than 38 dyne/cm.

In general, copying materials have the following values of surface energy. The surface energy of ordinary paper is 40–50 dyne/cm and the surface energy of OHP sheet is 40–45 dyne/cm. When the ink separating layer employed forms a difference not smaller than 5 dyne/cm from the critical surface tension of such a general copying material, the heated ink layer is almost 100 percent efficacious to transfer. When the quantity of heat for the ink layer is modulated, the half-liquid melted ink is transferred in response to the quantity of heat. Accordingly, the transferred dot area can be easily controlled by changing the input signal energy.

EXAMPLE 6-1

Parts of the thermal transfer recording medium as shown in FIG. 13 were prepared as follows.

(1) Anisotropic Electrically Conductive Layer 123

Copper wires having a diameter of 25 μm were arranged in parallel to each other in such density that at least one Cu wire would exist in an area of 50 μm×50 μm chosen in a statistical manner. Then Cu wires were fixed with thermosetting silicone resin by molding, to prepare an anisotropic electrically conductive layer. The surface of the anisotropic electrically conductive layer was polished so that the accuracy would be not less than 300 Å. The thickness of the layer was 3 μm. The value of resistance per unit area in the direction of the thickness (in the X-direction of FIG. 13) was 0.2 Ω. The value of resistance in the direction of the surface (in the Y-direction of FIG. 13) was not lower than $10^{12}$ Ω.

(2) Thermogenetic Resistor Layer 124

The anisotropic electrically conductive layer prepared in the paragraph (1) was sufficiently washed, dried and disposed in a vacuum system of a vacuum of $2\times10^{-6}$ torr. Then an argon gas was introduced to the vacuum system to form a vacuum of $3\times10^{-3}$ torr. Then a 2000 Å thick thermogenetic resistor layer having a value of resistance of $150\Omega/10^{-2}mm^2$ was formed on the anisotropic electrically conductive layer 123 by a high-frequency sputtering method using a TaN target containing 20% by weight of $Al_2O_3$.

(3) Return Electrode Layer 125

The sheet obtained in the paragraph (2) was coated with a 300 Å thick Cr film and a 2000 Å thick Al film, successively, in a destination vacuum of $1.0\times10^{-6}$ torr by an electron beam vacuum evaporating deposition method to thereby prepare a return electrode layer.

(4) Ink Separating Layer 128

A suspension Teflon dispersion was applied onto the return electrode layer and treated with heat at 350° C. to prepare a 1 μm thick ink separating layer. The critical surface tension of the ink separating layer was 20 dyne/cm. The measurement of the critical surface tension was made by a discone felt method. The decomposing point of this separating layer material was 420° C.

(5) Ink Layer 126

Yellow ink formed by mixing 9% by weight of benzidine yellow dye in styrene-acryl copolymer resin having a glass transition point of 60° C. was applied onto the ink separating layer to prepare a 13 μm thick ink layer.

The thermal transfer recording medium thus prepared was set in an apparatus as shown in FIG. 3. Then a recording was made by the apparatus using a line head having 100 μm-diameter needle electrodes arranged in the density of 8/mm. Recording electrical pulses of 20V, 60V, 100V and 250V were used respectively as a rectangular pulse having a width of 200 μm. Ordinary copying paper was used as recording paper. The thermal transfer recording medium and the recording paper were put between the backward elastic roller having a rubber hardness of 35 degrees and the line head while the line head was pressed to the backward elastic roller under pressure of 1.1 kg/cm², so that recording was made. Electrodes were connected to the return electrode layer 125 to make it possible to apply a 30V rectangular pulse having a pulse width of 250 μS continuously.

After thermal transfer recording was made in response to the picture signal, the transfer dot (recording dot) was estimated.

TABLE 13

| Item | Electric pulse voltage 20 V | 60 V | 100 V | 250 V |
|---|---|---|---|---|
| State of transfer | Starlike dot | Good circular dot | Good circular dot | Slightly wavy outlined dot |
| Dot diameter | 70 μm | 90 μm | 120 μm | 150 μm |
| Ink transfer rate | — | 84% | 94% | 97% |

The term "ink transfer rate" means the rate of the quantity of ink transferred to the copying material to the quantity of ink contained in the ink layer just under the needle electrode.

COMPARATIVE EXAMPLE 6-1

A thermal transfer recording medium was prepared in the same manner as Example 6-1, except that the ink separating layer in Example 6-1 was replaced by another 1 μm thick ink separating layer formed of polyethylene terephthalate resin. The same recording was made to estimate the transfer dot. The critical surface tension in the ink separating layer was 43 dyne/cm.

TABLE 14

| Item | Impressed voltage 20 V | 60 V | 100 V | 250 V |
|---|---|---|---|---|
| State of transfer | No transfer | Slight transfer Starlike | Almost circular but evenly slightly printed | Almost circular but evenly slightly printed |
| Ink transfer rate | 0% | 30% | 65% | 48% |

COMPARATIVE EXAMPLE 6-2

A thermal transfer recording medium was prepared in the same manner as Example 6-1, except that the ink separating layer in Example 6-1 was not formed in Comparative Example 6-2. The same recording was made to estimate the transfer dot. The critical surface tension in the return electrode layer being in contact with the ink layer was 68 dyne/cm.

TABLE 15

| Item | Impressed voltage 20 V | 60 V | 100 V | 250 V |
|---|---|---|---|---|
| State of transfer | No transfer | No transfer | Starlike and slightly printed | Starlike and slightly printed |
| Ink transfer rate | 0% | 0% | 14% | 21% |

Seventh Embodiment

The seventh embodiment of the present invention provides a thermal transfer recording medium in which ink supported by a support and containing a thermoplastic high molecular matter as a main component is heated to be transferred onto a recording matter to thereby perform recording, the support being composed of: an anisotropic electrically conductive layer including linear matters having $10^2$ Ω.cm or less volume resistivity and arranged in parallel in the direction of the thickness thereof and elastic resin having $10^{10}$Ω.cm or more volume resistivity, the linear matters being fixed with the elastic resin; a thermogenetic resistor layer; and an ink separating layer for carrying ink thereon, the thermogenetic resistor layer and the ink separating layer being laminated on the anisotropic electrically conductive layer in the order.

In the thermal transfer recording medium, the anisotropic electrically conductive layer passes a current in the direction of the thickness from needle electrodes being in contact with the anisotropic electrically conductive layer toward the thermogenetic resistor layer with low loss. When the anisotropic electrically conductive layer is formed of linear matters and high-resistance elastic resin for fixing the linear matters, electrical conductivity in the direction of the thickness thereof can be established to be $10^8$ times or more as large as electrical conductivity in the direction of the width thereof. In the case where electric pulses are sent from the needle electrodes, the contacting pressure can be kept uniform because the anisotropic electrically conductive layer has moderate elasticity. Accordingly, electric energy can be supplied efficiently through low contacting resistance.

In the aforementioned construction of the invention, high-efficient and high-quality recording can be made at a high speed.

The basic construction of the thermal transfer recording medium in the seventh embodiment is the same as that in the fifth or sixth embodiment. FIG. 13 is a vertical sectional view showing the basic construction.

EXAMPLE 7-1

Parts of the thermal transfer recording medium as shown in FIG. 13 were prepared as follows.

(1) Anisotropic Electrically Conductive Layer 123

Nickel wires having a diameter of 12.5 μm and coated with gold by evaporation plating were arranged in parallel to each other in such density that at least one nickel wire would exist in an area of 50 μm×50 μm chosen in a statistical manner. Then the nickel wires were fixed with RTV silicone elastomer by molding to thereby prepare an anisotropic electrically conductive layer. The surface of the anisotropic electrically conductive layer was polished so that the surface accuracy would be not less than 1000 Å. The thickness of the layer was 1.2 mm. The value of resistance per unit area in the direction of the thickness (in the X-direction of FIG. 13) was 0.7 Ω. The value of resistance in the direction of the surface (in the Y-direction of FIG. 13) was not smaller than $10^{15}$ Ω.

The volume resistivity of the RTV silicone elastomer was $10^{15}$ Ω.cm.

(2) Thermogenetic Resistor Layer 124

The anisotropic electrically conductive layer prepared in the above paragraph (1) was sufficiently washed, dried and disposed in a vacuum system to form a vacuum of $1.2\times10^{-6}$ torr. Then an argon gas was introduced to the vacuum system of a vacuum of $2\times10^{-3}$ torr. Then 3000 Å thick thermogenetic resistor layer having a value of resistance of $80\Omega/10^{-2}mm^2$ was formed on the anisotropic electrically conductive layer 123 by a high-frequency sputtering method using an $Al_2O_3$ target containing 5% by weight of Al.

(3) Return Electrode Layer 125

The sheet obtained in the above paragraph (2) was coated with a 500 Å thick Cr film and a 2500 Å thick Al film, successively, in a destination vacuum of $2.3\times10^{-6}$ torr by an electron beam vacuum evaporating deposition method to thereby prepare a return electrode layer.

(4) Ink Separating Layer 128

A suspension Teflon dispersion was applied onto the return electrode layer and treated with heat at 320° C. to prepare a 2 μm thick ink separating layer. The critical surface tension of the ink separating layer was 19 dyne/cm.

(5) Ink Layer 126

Thermally melting cyan ink formed by mixing 10% by weight of phthalocyanine dye in acryl resin having a glass transition point of 62° C. was applied onto the ink separating layer to prepare a 8 μm thick ink layer.

The thermal transfer recording medium thus prepared was set in an apparatus as shown in FIG. 3. Then a recording was made by the apparatus using a line head having 100 μm-diameter needle electrodes arranged in the density of 8/mm. Recording electrical pulses of 50V, 150V, 300V and 450V were used respectively as a rectangular pulse having a width of 150 μm. Ordinary copying paper (critical surface tension: 43 dyne/cm) was used as recording paper. The thermal transfer recording medium and the recording paper were put between the backward elastic roller having a rubber hardness of 40 degrees and the line head while the line head was pressed to the backward elastic roller under pressure of 1.2 kg/cm$^3$, so that recording was made. Electrodes were connected to the return electrode layer 125 to make it possible to apply a 30V rectangular pulse having a pulse width of 120 μS continuously.

After a thermal transfer recording was made corresponding to the picture signal, the transfer dot (recording dot) was estimated.

TABLE 16

| Characteristic | Electric pulse voltage 50 V | 150 V | 300 V | 450 V |
|---|---|---|---|---|
| State of transfer | Good circular dot | Good circular dot | Good circular dot | Slightly starlike dot |
| Dot diameter | 43 μm | 80 μm | 120 μm | 190 μm |

The aforementioned embodiments (from the fifth embodiment to the seventh embodiment) according to the present invention have the following effects.

(1) Printing can be made at high speed.

Because the ink layer is near the thermomagnetic resistor layer, thermal conduction can be made rapidly. The time constant in the printing operation can be reduced to be not longer than 200 μsec or 300 μsec. Accordingly, the printing operation can be made at a high speed of from 100 to 200 cpm by use of a line head.

(2) A high-quality picture can be attained.

Any ink material can be selected for use in the thermal transfer recording medium of the present invention, as long as the ink material has thermoplastic property. Accordingly, scope for selection is large. When, for example, a certain suitably selected coloring material is mixed in a transparent high molecular material, the coloring material can be selected from wide-ranging coloring materials (pigments and dyes) to attain a satisfactory color tone. Because, the coloring material is surrounded by the high molecular material, little deterioration or decomposition of the coloring material caused by direct irradiation of ultraviolet rays or caused by contact with oxygen occurs. Accordingly, the color tone and solidness of the coloring material can be established on the same level with those attained by presswork.

(3) Multistageous tone expression can be attained.

Because the recording medium has a good response to the input signal, the quantity of ink to be transferred to the recording paper can be adjusted by the intensity modulation of the input signal. Accordingly, multistageous tone expression having three or more stages can be made for each dot without use of a so-called dot matrix pattern method. Accordingly, middle tone (half tone) expression of 8–16/mm is kept. Of course, full-color tone expression can be made.

(4) Energy saving can be attained.

As described above, energy loss caused by thermal diffusion is low because the ink layer is near the thermogenetic resistor layer. Furthermore, the electrical resistance of the current path for leading a current to the thermogenetic resistor layer is low. Accordingly, energy loss can be further reduced. Because fixing treatment or the like is not required, there is no waste of energy. Consequently, there arises an economical savings in that recording can be made by energy of 100–700 erg per dot in the case where the recording density is 8 dots/mm.

(5) High reliability can be attained.

The quantity of thermogenesis can be adjusted by controlling the value of resistance in the thermogenetic resistor layer. Furthermore, use of a heat-resistant material such as ceramics in the thermogenetic resistor layer makes it possible to produce the layer easily with the thickness being controlled to a value of the order of tens Å. Further, the stable process (recording operation) can be attained in the humidity region of 10–90%(Rh) and in the temperature region of 5°–30° C. In short, high reliability can be attained. Accordingly, humidity control for handling pulverulent bodies in laser printers or electrostatic recording type apparatus and temperature control for stabilizing ink viscosity in ink-jet type apparatus are not required. Consequently, easy maintenance and management can be attained.

(6) Increase efficiency in ink transfer.

Because the ink layer is formed on the ink separating layer having critical surface tension not more than 38 dyne/cm, efficiency in ink transfer is good. Accordingly, picture quality is improved to increase reliability on printing. A stable recording operation can be attained in spite of the change of temperature or the change of humidity. Even in very cold conditions, a good recording can be made by adjusting the input energy. Accordingly, total reliability can be improved.

(7) High-density recording can be made.

Use of the linear matters as an electrical conductor in the anisotropic electrically conductive layer makes it easy to increase density in arrangement thereof. When, for example, 10 μm-diameter metal wires are used, the density of about 50/mm can be formed easily. The recording dot diameter can be reduced corresponding to the density in arrangement of the wires, so that high-density recording can be made.

(8) The anisotropic electrically conductive layer has high heat resistance.

Heat resistance against 300° C. or more can be secured by use of silicone elastomer to fix the linear matters of the anisotropic electrically conductive layer. A high-quality thermal transfer recording medium can be produced through selection of mechanical characteristic such as elasticity and other characteristics.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A current-conducting thermosensitive recording ink medium comprising: a stratified ink support having a surface dimension extending in a first direction and a thickness dimension extending in a second direction orthogonal to the first direction, said support having an electrical conductivity in the second direction greater than the electrical conductivity in the first direction; a thermogenetic resistor layer overlaying the ink support for producing heat by current conduction; an electrode layer electrically connected to and overlaying said thermogenetic resistor layer; a thermally melting ink layer, overlaying the electrode layer, composed of at least a thermoplastic high molecular material which is meltable by thermogenesis of said thermogenetic resistor layer; and an ink separating layer disposed between said electrode layer and said thermally melting ink layer for facilitating the separation of melted ink from said electrode layer, said ink separating layer having its critical surface tension of not larger than 38 dyne/cm and its decomposing point of 150° C. or more.

2. A current-conducting thermosensitive recording ink medium according to claim 1, wherein the electrode conductivity in the second direction is about ten times or more the electrical conductivity in the first direction.

3. A current-conducting thermosensitive recording ink medium according to claim 1, wherein the ink support has an electrical resistance in the second direction of not larger than about $100\Omega/mm^2$.

4. A current-conducting thermosensitive recording ink medium according to claim 1, wherein the thermogenetic resistor layer has volume resistivity within a range of from $10^{-2}\Omega$.cm to $10^{3}\Omega$.cm.

5. A current-conducting thermosensitive recording ink medium according to claim 1, wherein the thermogenetic resistor layer contains at least one ruthenium IV compound.

6. A current-conducting thermosensitive recording ink medium according to claim 5, wherein the ruthenium IV compound is $RuO_2$.

7. A current-conducting thermosensitive recording ink medium according to claim 5, wherein the ruthenium IV compound is $Bi_2Ru_2O_7$.

8. A current-conducting thermosensitive recording ink medium according to claim 1, wherein the thermogenetic resistor layer includes material having a negative temperature coefficient in the range of −2000 to +2000.

9. A current-conducting thermosensitive recording ink medium according to claim 1, wherein the thermogenetic resistor layer includes at least one compound or element selected from a group consisting of tantalum (Ta), silicon oxide ($SiO_2$), boron nitride (BN) silicon carbide (SiC), ruthenium (Ru) and zirconium (Zr).

10. A current-conducting thermosensitive recording ink medium according to claim 1, wherein the electrode layer has an electrical resistance of not greater than one-tenth the electrical resistance of said thermogenetic resistor layer.

11. A current-conducting thermosensitive recording ink medium according to claim 1, wherein the electrode layer has a surface dimension different than an overlaying layer for exposing at least one end.

12. A current-conducting thermosensitive recording ink medium having an ink support for holding ink that is heated for transfer to a recording material, said ink support comprising: an anisotropic electrically conductive layer having a surface dimension extending in a first direction and a thickness dimension extending into a second direction orthogonal to the first direction, the layer having an electrical conductivity in the second direction of at least ten times as large as the electrical conductivity in the first direction; a thermogenetic resistor layer overlaying the ink support for producing heat by current conduction; an electrode layer electrically connected to and overlaying said thermogenetic resistor layer; an ink separating layer overlaying said return electrode layer and, a thermally melting ink layer, overlaying the ink separating layer, composed of a thermoplastic high molecular material which is meltable by thermogenesis of said thermogenetic resistor layer.

13. A current-conducting thermosensitive recording ink medium according to claim 12, wherein the electrical resistance in the second direction of the anisotropic electrically conductive layer is not larger than about $100\Omega/mm^2$.

14. A current thermosensitive recording ink medium according to claim 12, wherein said anisotropic electrically conductive layer includes linear materials having $10^2\Omega$.cm or less volume resistivity and arranged in parallel to the second direction and elastic resin having $10^{10}\Omega$.cm or more volume resistivity, said linear materials being fixed with said elastic resin.

15. A current-conducting thermosensitive recording ink medium according to claim 14, wherein said thermogenetic resistor layer has a volume resistivity with a range of $10^{-2}\Omega$.cm to $10^3\Omega$.cm per unit sectional area.

16. A current-conducting thermosensitive recording ink medium according to claim 14, wherein said electrode layer has volume resistivity of not larger than about $1\times10^{-1}$ to about $5\times10^{-1}$ times as large as said thermogenetic resistor layer.

17. A current-conducting thermosensitive recording ink medium according to claim 14, wherein said ink separating layer has surface tension not more than 38 dyne/cm.

* * * * *